(12) United States Patent
Gopalakrishnan et al.

(10) Patent No.: US 8,275,860 B2
(45) Date of Patent: Sep. 25, 2012

(54) DYNAMIC CONFIGURATION OF ACCESS POINT NAMES IN GATEWAYS

(75) Inventors: Saikrishnan Gopalakrishnan, San Jose, CA (US); Renhua Wen, San Ramon, CA (US); Bhaskar Bhupalam, Sunnyvale, CA (US); Virendra Malaviya, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 929 days.

(21) Appl. No.: 11/612,358

(22) Filed: Dec. 18, 2006

(65) Prior Publication Data
US 2008/0146255 A1     Jun. 19, 2008

(51) Int. Cl.
*G06F 15/177* (2006.01)
(52) U.S. Cl. ........ 709/220; 370/254; 370/338; 370/351; 370/352; 370/401; 709/221
(58) Field of Classification Search ................. 370/229, 370/230, 232, 352, 468, 328; 455/433, 411, 455/422.1
See application file for complete search history.

(56) References Cited

U.S. PATENT DOCUMENTS

| | | | |
|---|---|---|---|
| 2001/0053694 A1* | 12/2001 | Igarashi et al. | 455/433 |
| 2003/0002480 A1* | 1/2003 | Giustina et al. | 370/352 |
| 2003/0176188 A1* | 9/2003 | O'Neill | 455/433 |
| 2004/0121779 A1* | 6/2004 | Muhonen et al. | 455/453 |
| 2004/0125762 A1* | 7/2004 | Haller et al. | 370/313 |
| 2008/0132268 A1* | 6/2008 | Choi-Grogan et al. | 455/550.1 |

* cited by examiner

*Primary Examiner* — Anthony Addy
*Assistant Examiner* — Manpreet Matharu
(74) *Attorney, Agent, or Firm* — P. Su

(57) ABSTRACT

Methods and apparatus for maintaining access point names (APNs) at a centralized location for distribution to gateway nodes are disclosed. According to one aspect of the present invention, a method for maintaining service profile information includes receiving the service profile information from a server arrangement that is substantially external to a node. The server arrangement and the node are associated with a network that supports a general packet radio service (GPRS) protocol. The method also includes storing the service profile information in a memory of the node.

23 Claims, 6 Drawing Sheets

DYNAMIC CONFIGURATION OF ACCESS POINT NAMES IN GATEWAYS

BACKGROUND OF THE INVENTION

1. Field of Invention

The present invention relates generally to systems for delivering multimedia services.

2. Description of the Related Art

In network communications, general packet radio services (GPRS) is a packet-based wireless communications service that provides a substantially continuous internet connections to mobile devices. GPRS is a protocol that enables data to be communicated and exchanged over a private or public network of mobile devices, e.g., mobile phones. Typically, data that is transmitted and received in a network that supports GPRS is transmission control protocol (TCP) or internet protocol (IP) based. As the use of GPRS increases, mobile subscribers who access private data networks (PDNs) or virtual private networks (VPNs), for example, have the ability to be substantially continuously connected to VPNs in a wireless manner.

To use GPRS, a mobile device such as a mobile phone activates a packet data protocol (PDP) context. In activating a PDP context, an access point is selected. An access point for GPRS may be an IP, or internal packet, network to which a mobile device is connected. An access point for GPRS may generally be a connection to the internet The access point may be used in a domain name service (DNS) query to a private DNS network.

Mobile operators, e.g., universal mobile telecommunication system (UTMS) operators, use access point names (APNs) to provide mobile subscribes with a variety of services. APN profiles are administered at gateway GPRS support or service nodes (GGSNs) which support edge routing functions within networks that utilize GPRS. A GGSN generally provides an interface between a GPRS wireless data network and other networks.

When an access point which is within reach of a GGSN is identified for the first time, or when there is a change in the set of access points that are within reach of the GGSN, a network administrator generally modifies APN profiles stored on the GGSN to identify the access point. The modification of APN profiles may occur locally via a command line interface.

As the number of access points within networks increases, the number of APNs that need to be provisioned within GGSNs also increases. Manually administering and modifying APN profiles for a GGSN each time information pertaining to associated access points is updated, e.g., when the reachability of an access point changes, is inefficient. Processing updates of APN profiles is time-consuming, and the manual process of administering and modifying APN profiles is inflexible and error prone. Further, for a particular access point that is associated with multiple GGSNs, the APN information for the access point is manually provided to each of the GGSNs, which is also time-consuming.

Therefore, what is needed is a system which enables the administration and modification of APNs to be done substantially dynamically. That is, what is desired is a system which enables APNs to be administered and modified at a centralized location, and then distributed to GGSNs that are associated with the APNs.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

According to one example aspect of the present invention, a method for maintaining service profile information includes receiving the service profile information from a server arrangement that is substantially external to a node. The server arrangement and the node are associated with a network that supports a general packet radio service (GPRS) protocol. The method also includes storing the service profile information in a memory of the node.

Description

By providing a centralized location in which access point names (APNs) or, more generally, service point profiles may be stored, the modification and administration of the APNs is facilitated. A network administrator may update APN information in the centralized location, and the updated APN information may be substantially automatically distributed to each gateway general packet radio service node (GGSN) that requires, or otherwise utilizes, the APN information. Hence, APN information may be modified and administered efficiently in a dynamic manner.

In one embodiment, APN profiles may be provisioned and managed on a centralized APN database, e.g., a database stored on a server that is external to a GGSN. APN profiles may be distributed to one or more GGSNs from the centralized APN database. As the APN profiles are maintained in one place, the accuracy with which APN profiles are provided to GGSNs may be enhanced, as the likelihood of error associated with manually entering APN profiles into each GGSN is effectively eliminated.

Figure 1A:
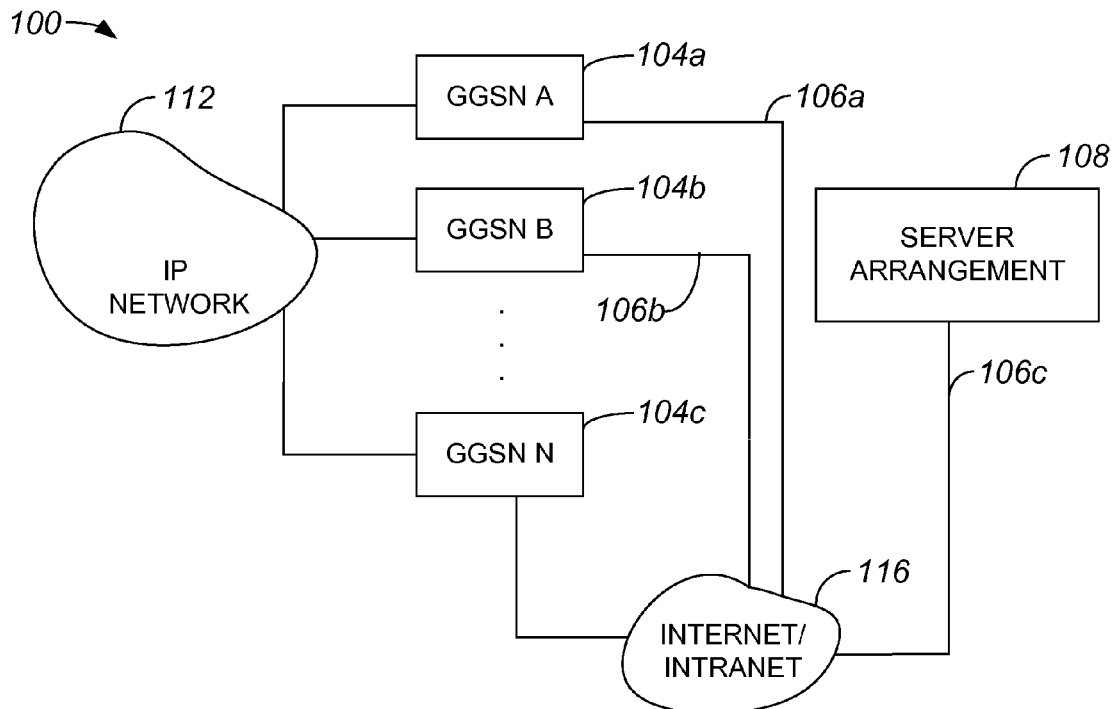
FIG. 1A is a diagrammatic representation of a first overall network in which gateway nodes obtain dynamically maintained service profiles from a centralized location which includes a server arrangement in accordance with an embodiment of the present invention.

A centralized location that stores APN information or more generally, service profiles, may be a server arrangement that has provisioning functionality. FIG. 1A is a diagrammatic representation of an overall network in which gateway nodes obtain dynamically maintained service profiles from a server arrangement in accordance with an embodiment of the present invention. A network 100 includes a plurality of GGSNs 104a-c which, in one embodiment, forms a GGSN server farm. GGSNs 104a-c are in communication with server arrangement 108, an internet protocol (IP) network 112, and an internet and/or intranet 116. GGSNs 104a-c may include router functionality, and generally support edge routing associated with a GPRS network.

Figure 1B:
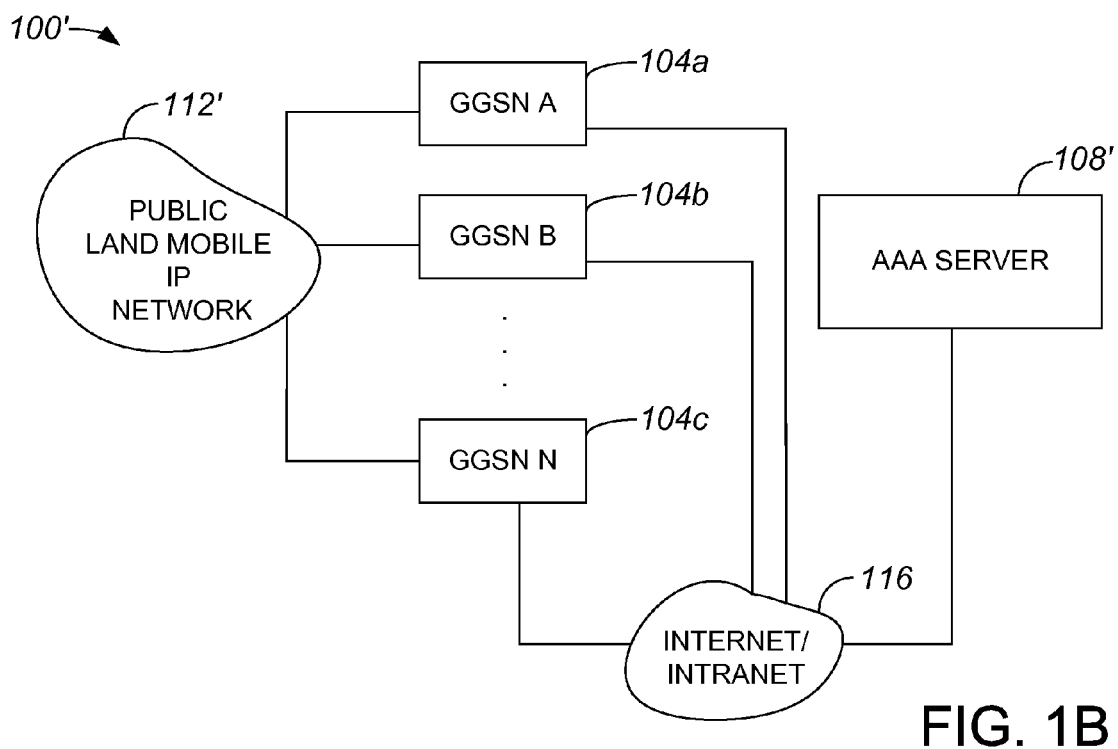
FIG. 1B is a diagrammatic representation of an overall network in which gateway nodes obtain dynamically maintained access point names (APNs) from a centralized authenticating/authorizing/accounting (AAA) server arrangement in accordance with an embodiment of the present invention.
Figure 1C:
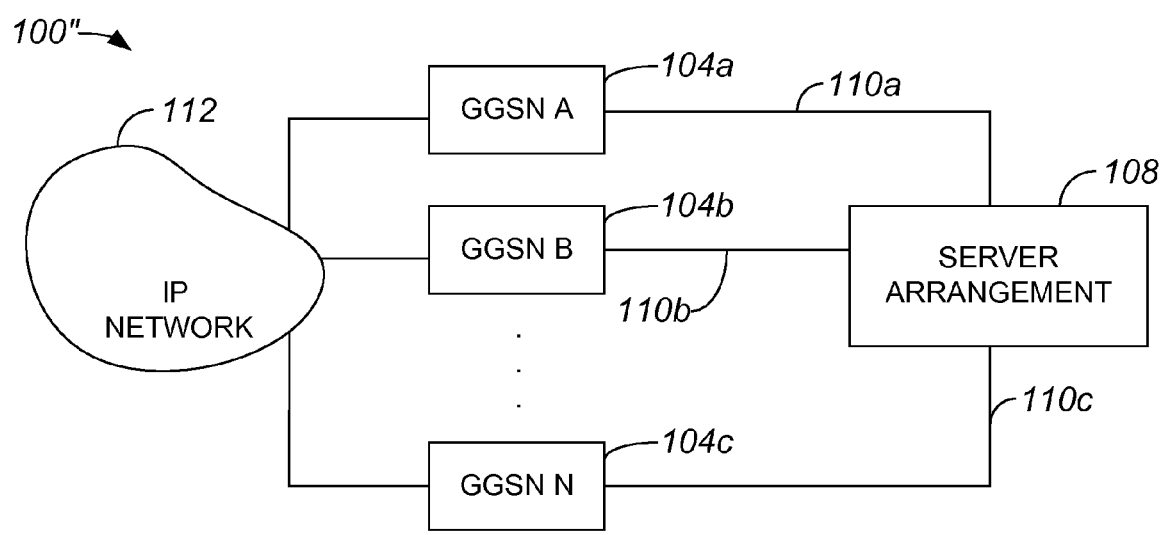
FIG. 1C is a diagrammatic representation of a second overall network in which gateway nodes obtain dynamically maintained service profiles from a centralized location which includes a server arrangement in accordance with an embodiment of the present invention.

Server arrangement 108, which may be a server group that is external to GGSNs 104a-c, distributes service profiles to GGSNs 104a-c. Service profiles may be distributed to GGSNs 104a-c using connections 106a-c and internet and/or intranet 116. It should be appreciated that although server arrangement 108 is in communication with GGSNs 104a-c through internet and/or intranet 116, in one embodiment, network 100 may not necessarily include internet and/or internet 116, as shown in FIG. 1C. As shown in FIG. 1C, a network 100" may enables server arrangement 108 to communicate with GGSNs 104a-c using direct connections 110a-c, respectively.

Returning to FIG. 1A, service profiles that are distributed by server arrangement 108 may include APN profiles, information, or configurations. That is, server arrangement 108 may effectively include a centralized APN database and manage APNs. The APNs identify access points within IP network 112 to which at least some GGSNs 104a-c may have access.

The configuration of server arrangement 108 may vary widely. By way of example, server arrangement 108 may include an authenticating/authorizing/accounting (AAA) server. FIG. 1B is a diagrammatic representation of an overall network in which gateway nodes obtain dynamically maintained APNs from a AAA server in accordance with an embodiment of the present invention. Within an overall network 100', which may be a universal mobile telecommunication system (UMTS) network, GGSNs 104a-c are in communication with a centralized AAA server 108' that distributes APNs or, more generally, APN information to GGSNs 104a-c. An operator, e.g., a network administrator, may administer and modify APN profiles on AAA server 108. Hence, APN information may be modified and then dynamically distributed to GGSNs 104a-c. Using the APN information, GGSNs 104a-c may provision APNs.

In one embodiment, a public land mobile IP network 112' may be, or include, an access point that may be configured on and accessible from at least one GGSN 104a-c has access. That is, an APN may identify public land mobile IP network 112' or some component of public land mobile IP network 112'. Public land mobile IP network 112' may be a packet data network that is capable of providing wireless communications to mobile end used, e.g., an individual with a cellular telephone. It should be appreciated that public land mobile IP network 112' may generally include a border gateway router (not shown).

Figure 2:
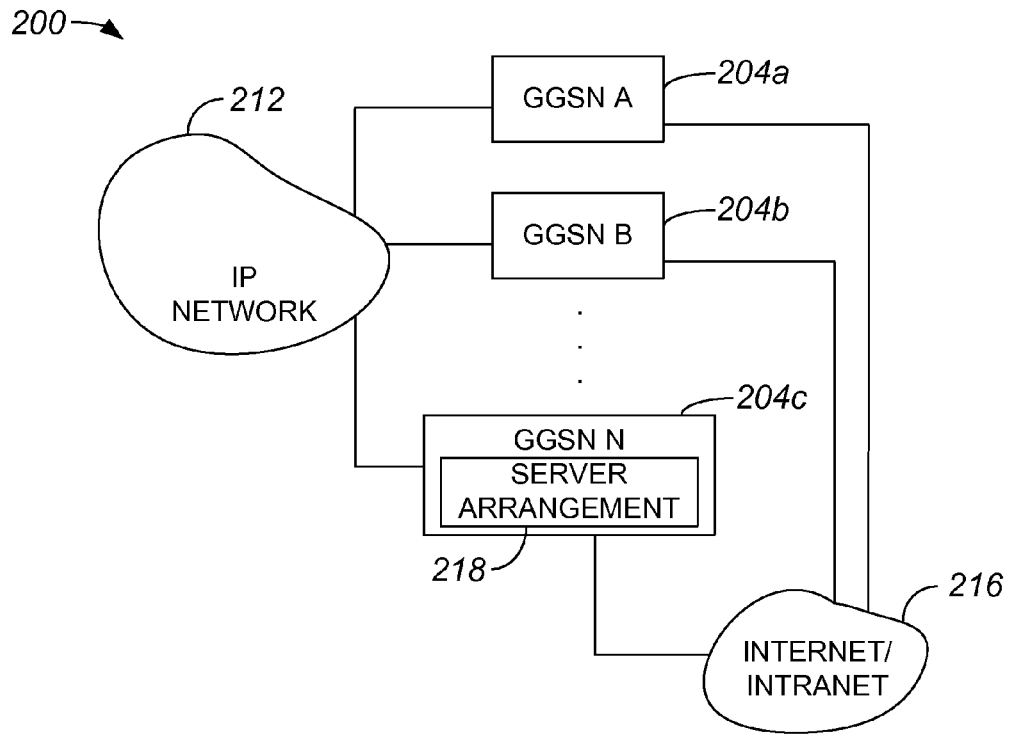
FIG. 2 is a diagrammatic representation of an overall network in which gateway nodes obtain dynamically maintained service profiles from a centralized arrangement that is a part of one of the gateway nodes in accordance with an embodiment of the present invention.

The centralized location which maintains an APN database is not limited to being an external server arrangement or group. For example, a centralized APN database may be included in a designated GGSN of a GGSN server farm such that the designated GGSN distributes APN profiles or configurations to every other GGSN. Referring next to FIG. 2, an overall network in which GGSNs obtain dynamically maintained service profiles from a centralized arrangement that is a part of one of the GGSNs will be described in accordance with an embodiment of the present invention. An overall network 200 includes a plurality of GGSNs 204a-c that are in communication with an IP network 212 and an internet and/or intranet 216. A GGSN 204c includes a server arrangement 218 that provisions and manages a centralized service profile, e.g., APN, database. In one embodiment, server arrangement 218 is arranged to effectively provide server functionality that obtains, maintains, and distributes service profile information to GGSNs 204a-c.

Figure 3:
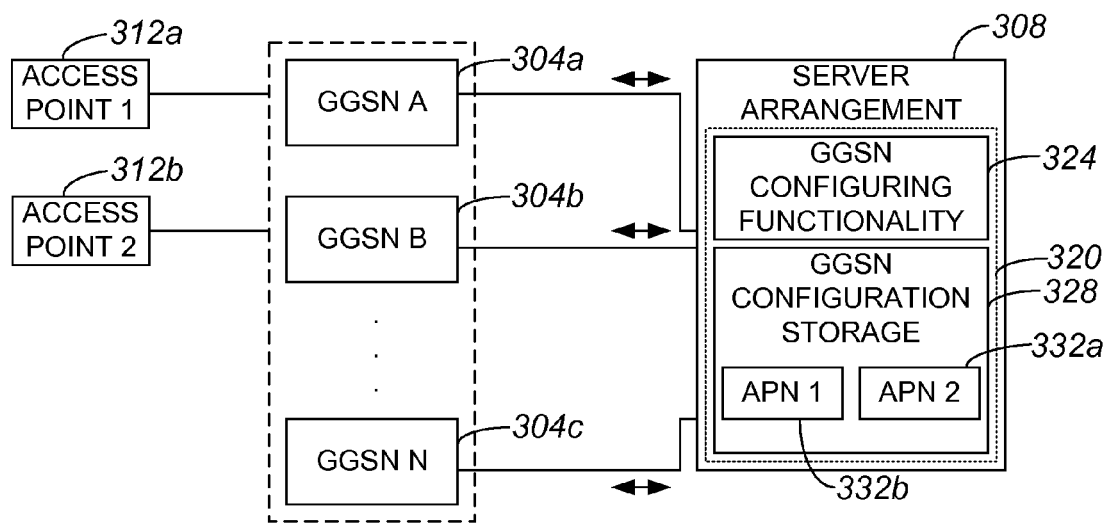
FIG. 3 is a block diagram representation of the functionality associated with a server arrangement that dynamically maintains service profiles that may be distributed to gateways in accordance with an embodiment of the present invention.

With reference to FIG. 3, the functionality associated with a server arrangement that dynamically maintains service profiles such as APN profiles which that may be distributed to GGSNs will be described in accordance with an embodiment of the present invention. A server arrangement 308 is in communication with GGSNs 304a-c which may have access to access points 312a, 312b. GGSNs 304a-c may each access the same set of access points 312a, 312b, or may each access different sets of access points 312a, 312b.

Server arrangement 308 includes a GGSN configuration arrangement 320. GGSN configuration arrangement 320 may include GGSN configuring functionality 324 and GGSN configuration storage 328 that stores APNs 332a, 332b associated with access points 312a, 312b, respectively. GGSN configuring functionality 324 includes logic that allows APNs 332a, 332b to be obtained and downloaded to GGSNs 304a-c. Appropriate APNs 332a, 332b to download to any given GGSN 304a-c may be identified by a GGSN identifier, e.g., an IP address. GGSN configuring functionality 324 may also include a user interface such as a graphical user interface that allows a user to enter information pertaining to APNs 332a, 332b. The logic included in GGSN configuring functionality 324 may include hardware logic and/or software logic, and may be embodied as code devices. Hardware logic may include various hardware components, and software logic may include code devices embodied on a tangible media or computer-readable medium. GGSN configuration storage 328 may include, but is not limited to, a database, a datastore, or a memory such as flash memory or random access memory.

Figure 4:
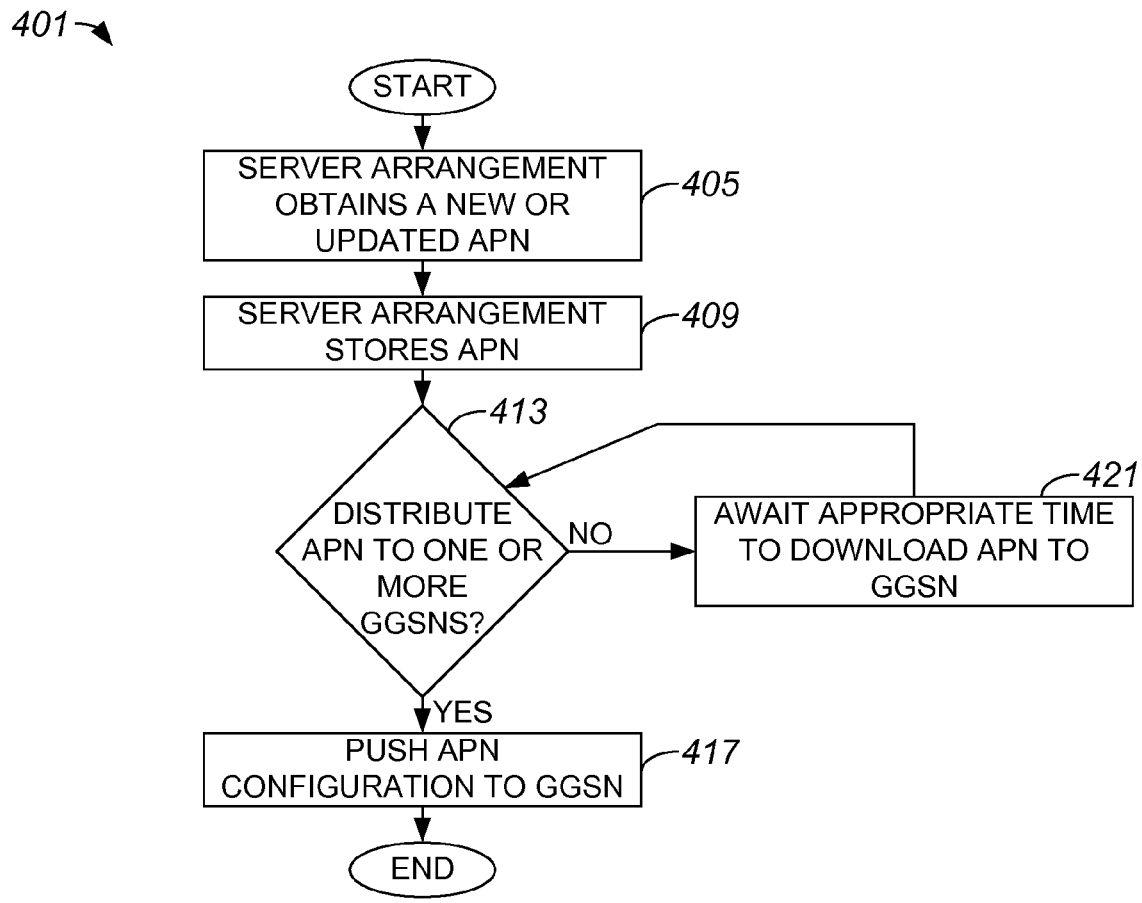
FIG. 4 is a process flow diagram which illustrates one method of providing APN information to a gateway in accordance with an embodiment of the present invention.

In general, a server arrangement such as server arrangement 308 may determine when to distribute an APN 332a, 332b or APN information to a GGSN 304a-c. FIG. 4 is a process flow diagram which illustrates one method of providing APN information to a GGSN in accordance with an embodiment of the present invention. A process 401 of providing APN information to a GGSN begins at step 405 in which a server arrangement obtains a new or updated APN. A new or updated APN may be obtained through a user interface that is accessed by a network administrator. Once a new or updated APN is obtained, the server arrangement stores the obtained APN in step 409. Typically, the obtained APN may be stored along with an indication of at least one GGSN that may be capable of accessing the access point identified by the APN.

A determination is made in step 413 as to whether the APN is to be distributed to at least one GGSN, i.e., one or more GGSNs. It should be appreciated that the distribution of an APN or APN information to at least one GGSN may be performed periodically on a substantially pre-scheduled basis, on-demand from the GGSN, when the GGSN boots up, or when new or updated APN information is available on the server arrangement. In general, the APN information may either be pushed onto at least one GGSN, or a GGSN may pull the APN information from the server arrangement.

If it is determined in step 413 that the APN is to be distributed to at least one GGSN, the APN configuration is pushed to the GGSN in step 417, and the process of providing APN information to a GGSN is completed. The APN may be downloaded to at least one GGSN alone, or with other APNs that may be available for downloading. Alternatively, if it is determined in step 413 that the APN is not to be distributed to the GGSN, the indication is that the time is not appropriate to distribute the APN to the GGSN. As such, process flow moves to step 421 in which the server awaits an appropriate time to download the APN to at least one GGSN. From step 421, process flow returns to step 413 in which a determination is made regarding whether to distribute the APN to a GGSN.

Figure 5A:
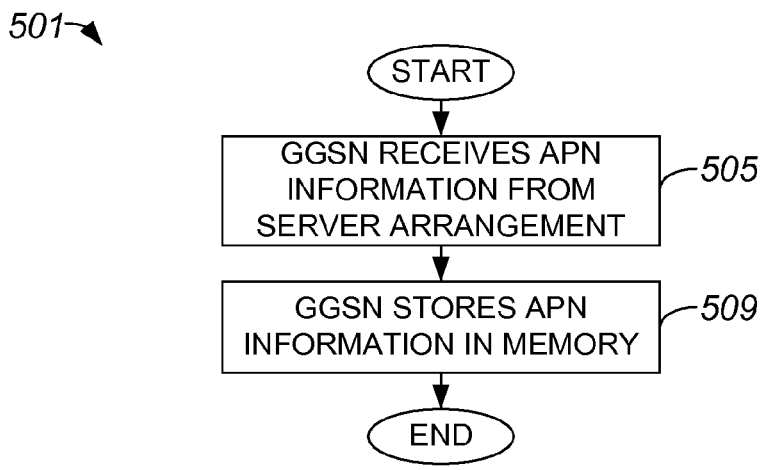
FIG. 5A is a process flow diagram which illustrates a method of pushing APN information from a server arrangement to a gateway in accordance with an embodiment of the present invention.

As mentioned above, an APN or APN information may either be pushed onto a GGSN by a server arrangement or pulled from a server arrangement by a GGSN. FIG. 5A is a process flow diagram which illustrates a method of pushing APN information from a server arrangement to a GGSN in accordance with an embodiment of the present invention. A process 501 of pushing APN information onto a GGSN begins at step 505 in which the GGSN receives APN information from a server arrangement. The APN information may generally be received on an input port or interface of the GGSN. Upon receiving the APN information, the GGSN stores the APN information in memory in step 509. If the APN associated with the APN information already exists on the GGSN, the existing APN may be updated with the APN information. If the APN associated with the APN information does not exist on the GGSN, a new APN may be created locally using the APN information, and the new APN may service new Create_PDP context requests. Once the APN information is stored, the process of pushing APN information onto a GGSN is completed.

Figure 5B:
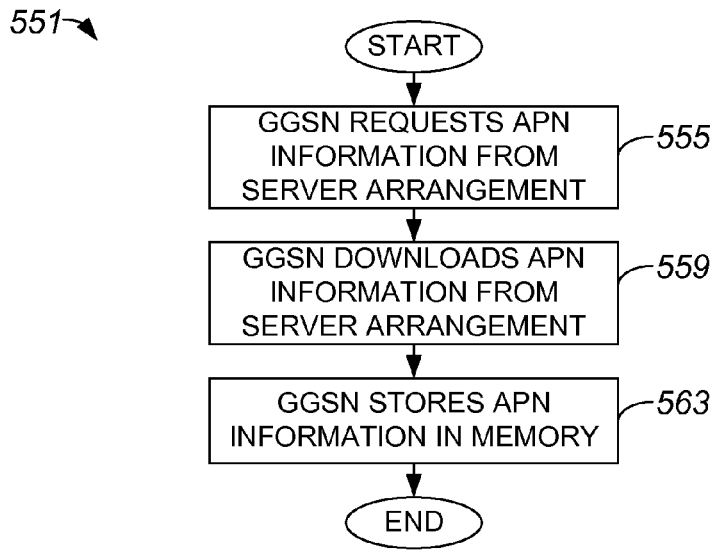
FIG. 5B is a process flow diagram which illustrates a method of pulling APN information from a server arrangement in accordance with an embodiment of the present invention.

With reference to FIG. 5B, a method of pulling APN information from a server arrangement will be described in accordance with an embodiment of the present invention. A process 551 of pulling APN information from a server arrangement begins at step 555 in which a GGSN requests APN information from the server arrangement. The GGSN may request the APN information when the GGSN is booting up, or on an on-demand basis. After the GGSN requests the APN information from the server arrangement, the GGSN downloads the APN information from the server arrangement in step 559. Then, in step 563, the GGSN stores the APN information in memory, and the process of pulling APN information from a server arrangement is completed.

When a GGSN requests APN information on an on-demand basis, the on-demand basis may be associated with a create packet data protocol (PDP) context request. As will be appreciated by those skilled in the art, a PDP context is requested and activated when a mobile user wishes to use GPRS. A PDP context is a data structure that specifies aspects that may include, but are not limited to including, routing, quality of service, and security. An access point is effectively selected when a PDP context is set up.

Figure 6:
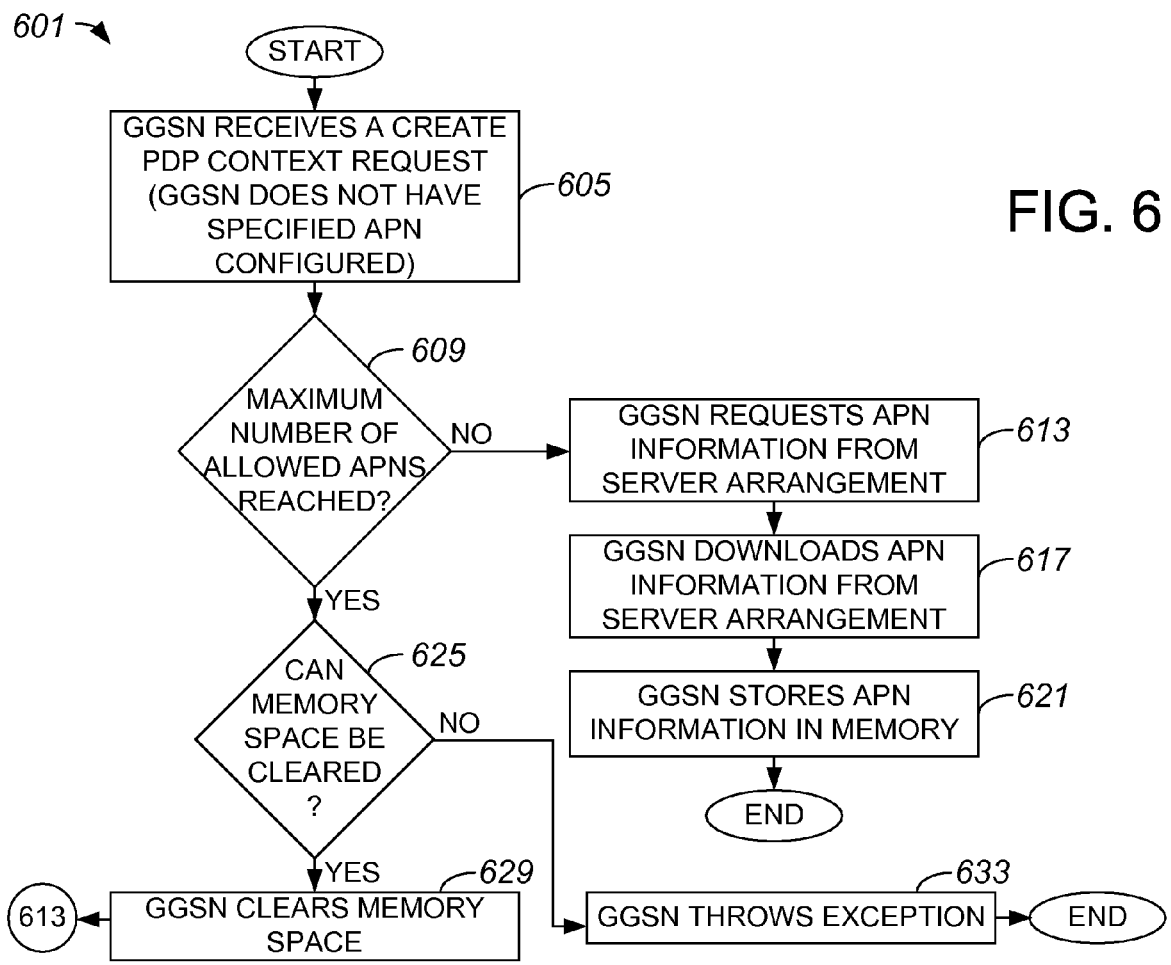
FIG. 6 is a process flow diagram which illustrates a method of obtaining APN information from a server arrangement in response to a create packet data protocol (PDP) context request in accordance with an embodiment of the present invention.

FIG. 6 is a process flow diagram which illustrates a method of obtaining APN information from a server arrangement in response to a create PDP context request in accordance with an embodiment of the present invention. A process 601 of obtaining APN information begins at step 605 in which a GGSN receives a create PDP context request, e.g., from a mobile user or subscriber. In the described embodiment, the GGSN does not have a configuration for the APN specified in the request.

A determination is made in step 609 as to whether the maximum number of allowed APNs associated with the GGSN has been reached. If it is determined that the maximum number of allowed APNs has been reached, it is determined in step 625 whether memory space may be cleared to accommodate the APN specified in the create PDF context request. If it is determined that memory space may be cleared, the indication is that one or more existing APNs stored on the GGSN has no associated PDPs and may be replaced. In general, either the least used APN or the least recently used APN may be replaced, although the APN that is purged from the memory of the GGSN may be substantially any APN stored thereon. Accordingly, in step 629, the GGSN clears memory space by substantially removing an APN with no associated PDPs.

From step 629, process flow moves to step 613 in which the GGSN requests APN information from the server arrangement. Then, in step 617, the GGSN downloads APN information from the server arrangement. After the GGSN downloads the APN information, the GGSN stores the APN information in memory in step 621, and the process of obtaining APN information is completed.

Returning to step 625, if the determination is that memory space may not be cleared, the implication may be that substantially all APNs stored on the GGSN have associated PDPs. As such, the create PDP context request may not be accommodated, and the GGSN throws an exception at step 633. Once the exception is thrown, the process of obtaining APN information is terminated.

Returning to step 609, is it is determined that the maximum number of allowable APNs has not been reached, then APN information may be obtained and stored by the GGSN. Hence, process flow moves from step 609 to step 613 in which the GGSN requests information from the server arrangement.

Figure 7A:
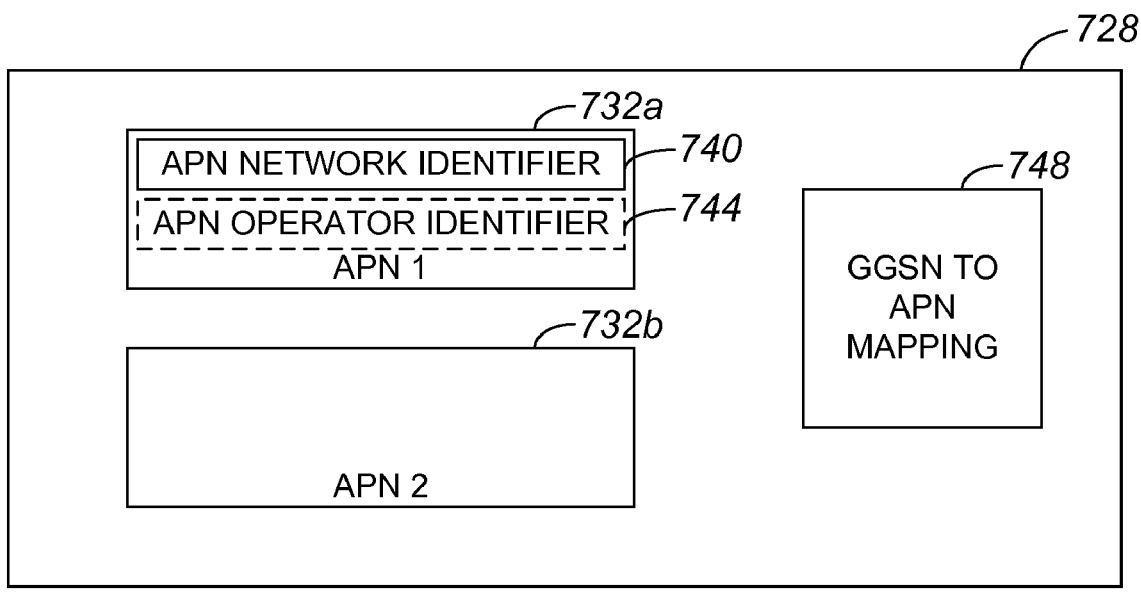
FIG. 7A is a block diagram representation of contents of a storage element of a server arrangement that stores APN information in accordance with an embodiment of the present invention.

When an APN or APN information is stored in a memory or storage element of a server arrangement, the APN may be stored with mapping information and may include different parts. FIG. 7A is a block diagram representation of contents of a storage element of a server arrangement that stores APN information in accordance with an embodiment of the present invention. A storage element 628 includes APN information 632*a*, 632. APN information 632*a* may include an APN network identifier 640 and an APN operator identifier 644. APN network identifier 640 defines an external network to which an associated GGSN is connected, and APN operator identifier 644 identifies a public land mobile IP network backbone on which the associated GGSN is located. APN operator identifier 644 may be optional. However, if both APN network identifier 640 and APN operator identifier 644 are included in APN information 632*a*, APN information 632*a* may correspond to a domain name service (DNS) name of an associated GGSN.

A mapping 648 is arranged to map GGSNs to APN information 632*a*, 632*b*. In other words, mapping 648 identifies GGSNs that have access to access points identified by APN information 632*a*, 632*b*.

Figure 7B:
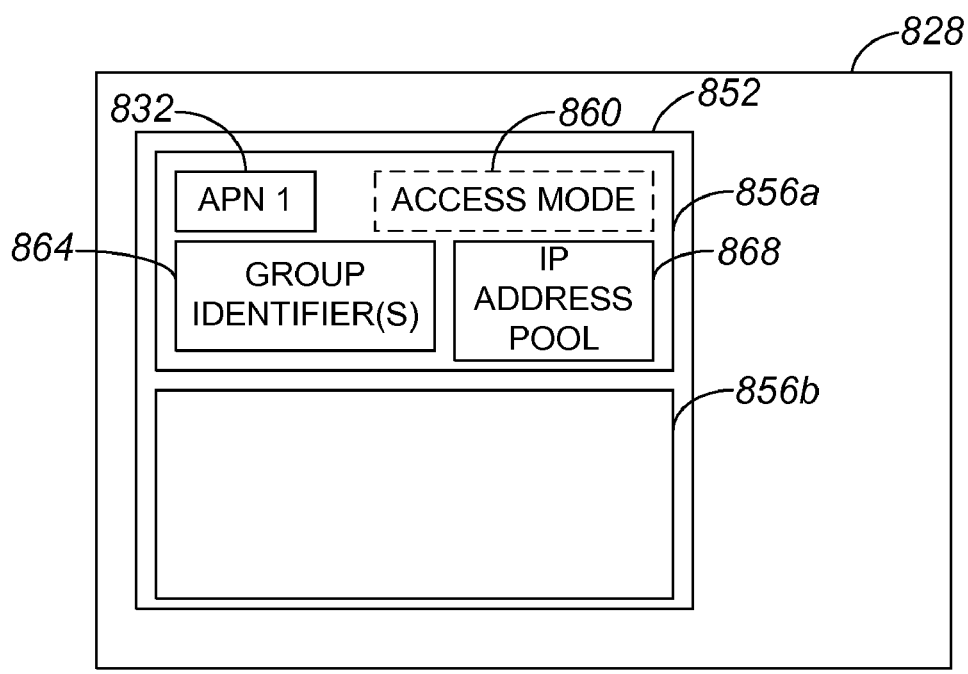
FIG. 7B is a block diagram representation of a first format in which APN information may be stored in a storage element of a server arrangement in accordance with an embodiment of the present invention.

In general, the format in which APN information may be stored in a storage element may vary. FIG. 7B is a block diagram representation of a first format in which APN information may be stored in a storage element of a server arrangement in accordance with an embodiment of the present invention. A storage element 828 includes an access point list 852 that includes records 856a, 856b for each access point stored within storage element 828. Record 856a includes an APN 832, group identifiers 864, an IP address pool 868, and an optional access mode 860. Group identifiers 864 identify AAA groups. IP address pool 868 may identify a range of IP addresses to allocate for end stations coming through a particular APN. Access mode 860 specifies the type of access allowed to a public data network through an access point, and may either be a transparent mode in that substantially no authentication is conducted for a Create_PDP context request, or a non-transparent mode in that authentication is conducted for a Create_PDP context request.

Although only a few embodiments of the present invention have been described, it should be understood that the present invention may be embodied in many other specific forms without departing from the spirit or the scope of the present invention. By way of example, although an APN or APN information has been described as being stored in a centralized location, substantially any service profile may be stored in a centralized location and then distributed to gateway nodes. In general, substantially any service profile that may be dynamically configured may be maintained on a centralized server arrangement and then distributed to gateway nodes.

While GGSNs have been described as being dynamically provided with APN or service profiles, substantially any gateway node may be dynamically provided with service profiles. In other words, the present invention is not limited to being used with GGSNs and, instead, may be implemented with respect to other gateway nodes. Other gateway nodes may include, but are not limited to, a packet data serving node and an access service network gateway.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method for maintaining service profile information on a node, the service profile information being access point name (APN) information, the method comprising:
   receiving the service profile information from a centralized server arrangement, the service profile information being received on the node, the centralized server arrangement being configured to dynamically maintain the service profile information, the centralized server arrangement being external to the node, wherein the centralized server arrangement and the node are associated with a network that supports a general packet radio service (GPRS) protocol;
   storing the service profile information in a memory of the node, wherein if a maximum number of APNs in the memory is reached, storing the service profile information includes replacing a first APN with the APN information, wherein the first APN is one selected from a group including a least used APN and a least recently used APN; and
   requesting the service profile information from the server arrangement if the maximum number of APNs stored in the memory is not reached.

2. The method of claim 1 wherein receiving the service profile information includes downloading the service profile information from the server arrangement.

3. The method of claim 2 further including:
   receiving a create packet data protocol (PDP) context request on the node; and
   determining if maximum number of APNs stored in the memory is reached, wherein the service profile information is requested from the server arrangement if the maximum number of APNs stored in the memory is not reached and in response to the request being received.

4. The method of claim 1 wherein the node is in communication with the server arrangement and arranged to access at least one access point associated with the APN information.

5. An apparatus comprising:
   means for receiving the service profile information from a server arrangement on a node, the service profile information being access point name (APN) information, the service profile information being received on a node, the server arrangement being substantially external to the node, wherein the server arrangement and the node are associated with a network that supports a general packet radio service (GPRS) protocol;
   means for storing the service profile information in a memory of the node after receiving the service profile information from the server arrangement, wherein if a maximum number of APNs in the memory is reached, the means for storing the service profile information in the memory include means for replacing a first APN with the APN information, wherein the first APN is one selected from a group including a least used APN and a least recently used APN; and
   means for requesting the service profile information from the server arrangement if the maximum number of APNs stored in the memory is not reached.

6. A node, the node being arranged to obtain service profile information from an external server, the service profile information being access point name (APN) information, the node and the external server being associated with a network, the node comprising:
   a memory;
   a first set of logic, the first set of logic being arranged to receive the service profile information from the external server; and
   a second set of logic, the second set of logic being arranged to store the service profile information in the memory of the node, wherein if a maximum numbers of APNs in the memory is reached, the second set of logic is arranged to store the service profile information in the memory by replacing a first APN with the APN information, wherein the first APN is one selected from a group including a least used APN and a least recently used APN; and
   a third set of logic, the third set of logic being arranged to request the service profile information from the server arrangement of the maximum number of APNs stored in the memory is not reached.

7. The node of claim 6 wherein the network is a universal mobile telecommunication system (UMTS) network.

8. The node of claim 7 wherein the first set of logic is capable of requesting the service profile information from the external server, and wherein the first set of logic is arranged to receive the service profile information by downloading the service profile information from the external server.

9. The node of claim 8 wherein the first set of logic further being capable of receiving a create PDP context request and determining if a maximum number of APNs stored in the memory is reached, wherein the service profile information is requested from the second set of logic if the maximum number of APNs stored in the memory is not reached.

10. A method for maintaining service profile information within a network that supports a general packet radio service (GPRS) protocol, the method comprising:
receiving a create packet data protocol (PDP) request for the service profile information, the request being received on a gateway GPRS service node (GGSN), the request identifying an access point name (APN), wherein the GGSN does not have a configuration for the APN identified in the request;
obtaining the service profile information from a server arrangement in response to the request, the service profile information including the APN, wherein the APN is one selected from a group including a new APN and an updated APN;
storing the service profile information on the GGSN, wherein storing the service profile information on the GGSN includes storing the service profile information when a maximum number of allowed APNs associated with the GGSN has not been reached, and wherein storing the service profile information on the GGSN includes determining whether space may be cleared in a memory of the GGSN to accommodate the service profile information when the maximum number of allowed APNs associated with the GGSN has been reached; and
distributing the service profile information within the network.

11. The method of claim 10 wherein storing the service profile information includes storing a mapping between the service profile information and the GGSN.

12. An arrangement, the arrangement being associated with a network that supports a general packet radio service (GPRS) protocol, the arrangement comprising:
logic that receives the service profile information, the service profile information including an access point name (APN), wherein the APN is one selected from a group including a new APN and an updated APN;
logic that stores the service profile information in a memory, wherein the logic that stores the service profile information is configured to store the service profile information when a maximum number of allowed APNs associated with the memory has not been reached, the logic that stores the service profile information is further configured to determine whether space may be cleared in the memory to accommodate the service profile information when the maximum number of allowed APNs associated with the memory has been reached; and
logic that distributes the service profile information to at least one gateway node within the network.

13. The arrangement of claim 12 wherein the logic that distributes the service profile information includes logic that receives a request for the service profile information from the at least one gateway node and logic that downloads the service profile information upon receiving the request.

14. The arrangement of claim 13 wherein the logic that stores the service profile information includes logic that stores a mapping between the service profile information and the at least one gateway node.

15. The arrangement of claim 12 wherein the logic that distributes the service profile information to the at least one gateway node includes logic that pushes the service profile information onto the at least one gateway node.

16. The arrangement of claim 12 wherein the service profile information is access point name (APN) information and the at least one gateway node is a gateway GPRS service node (GGSN).

17. An arrangement for maintaining service profile information within a network that supports a general packet radio service (GPRS) protocol, the arrangement comprising:
means for receiving the service profile information, the service profile information including an access point name (APN), wherein the APN is one selected from a group including a new APN and an updated APN;
means for storing the service profile information on a memory, wherein the means for storing the service profile information on the memory include means for storing the service profile information when a maximum number of allowed APNs associated with the memory has not been reached, and wherein the means for storing the service profile information on the memory further include means for determining
whether space may be cleared in the memory to accommodate the service profile information when the maximum number of allowed APNs associated with the memory has been reached; and
means for distributing the service profile information to at least one gateway node within the network.

18. The method of claim 1 wherein the server arrangement is an authenticating/authorizing/accounting (AAA) server.

19. The method of claim 1 wherein the node is a gateway general packet radio service node (GGSN).

20. The method of claim 1 wherein the server arrangement includes an access point name (APN) database and manages APNs, the APNs being arranged to identify access points within the network.

21. The method of claim 10 wherein storing the service profile information on the GGSN includes storing the service profile information in a memory of the GGSN.

22. The method of claim 10 wherein the server arrangement is external to the GGSN and includes a centralized service profile database, and wherein the server arrangement provisions and manages the centralized service profile database, wherein the service profile information is obtained from the centralized service profile database.

23. The method of claim 10 wherein the request is received from a subscriber.

* * * * *